US008661644B2

(12) United States Patent
Hand et al.

(10) Patent No.: US 8,661,644 B2
(45) Date of Patent: Mar. 4, 2014

(54) METHOD AND DEVICE FOR FORMING JOINTS IN COMPOSITE STRUCTURES

(75) Inventors: Michael Leslie Hand, Huntington Beach, CA (US); Douglas A. McCarville, Orting, WA (US); Jennifer S. Noel, Kent, WA (US)

(73) Assignee: The Boeing Company, Chicago, IL (US)

(*) Notice: Subject to any disclaimer, the term of this patent is extended or adjusted under 35 U.S.C. 154(b) by 522 days.

(21) Appl. No.: 12/898,850

(22) Filed: Oct. 6, 2010

(65) Prior Publication Data

US 2012/0084959 A1    Apr. 12, 2012

(51) Int. Cl.
*B23Q 1/00* (2006.01)
*B28B 7/28* (2006.01)

(52) U.S. Cl.
USPC .............. 29/283; 249/184; 264/257; 264/258

(58) Field of Classification Search
USPC ................ 29/428, 419.1, 446, 464, 700, 238, 29/281.1, 281.6; 249/184, 187.1; 425/470, 425/472, 389; 264/257, 258
See application file for complete search history.

(56) References Cited

U.S. PATENT DOCUMENTS

| | | | |
|---|---|---|---|
| 4,672,906 A | 6/1987 | Asai | |
| 4,824,513 A | 4/1989 | Dodds | |
| 4,842,670 A | 6/1989 | Callis | |
| 5,085,343 A | 2/1992 | Scarr | |
| 5,143,328 A | 9/1992 | Leonard | |
| 5,257,761 A | 11/1993 | Ratz | |
| 5,383,566 A * | 1/1995 | Johnson | 220/562 |
| 5,651,474 A | 7/1997 | Callaghan | |
| 6,082,676 A * | 7/2000 | Cochran | 244/172.3 |
| 6,158,605 A | 12/2000 | DeLay | |
| 7,093,337 B1 | 8/2006 | Taylor | |
| 7,540,143 B1 | 6/2009 | Greene | |
| 7,571,527 B2 | 8/2009 | Burnett et al. | |
| 7,640,961 B2 | 1/2010 | Stubner | |
| 7,669,729 B2 | 3/2010 | Matsuoka | |
| 7,699,188 B2 | 4/2010 | Oliveira | |
| 2006/0225265 A1 | 10/2006 | Burnett | |
| 2009/0236779 A1 * | 9/2009 | Stubner et al. | 264/573 |

FOREIGN PATENT DOCUMENTS

EP    2439059 A2    4/2012

* cited by examiner

*Primary Examiner* — David Bryant
*Assistant Examiner* — Jacob Cigna
(74) *Attorney, Agent, or Firm* — Yee & Associates, P.C.

(57) ABSTRACT

A tool is used to form a joint between a composite dome and a surrounding composite skirt. The tool includes a tool shell on which composite plies may be laid up to form the skirt and a spacer connected with the shell for filling a gap between the dome and the skirt.

19 Claims, 5 Drawing Sheets

METHOD AND DEVICE FOR FORMING JOINTS IN COMPOSITE STRUCTURES

TECHNICAL FIELD

This disclosure generally relates to methods and equipment for fabricating composite structures, and deals more particularly with a tool device for forming joints between two composite parts.

BACKGROUND

Composite structures may be compacted and/or cured using vacuum bags that are placed over the structure and sealed. Reasonably good access to bag edges may be needed in order to allow the use of conventional bag sealants, however, such access may be problematic in certain layup configurations. For example, in the case of a cylindrically shaped skirt that is laid up over a dome-shaped part to form a cryogenic propellant tank, access to the relatively narrow gap in the throat of a Y-joint between the two parts may be limited. This limited access may make it difficult to fit relatively thin bag material into the gap and bring the bag edges out to a point on the layup where they can be conveniently sealed with a conventional bag sealant.

One solution to the problem involves using a pre-cured inner skirt wall tool as left-in-place tooling that is bonded to the dome using a paste adhesive. The structural plies of the skirt are then laid over skirt wall. The use of paste adhesives however, may not provide the desired performance for some applications, especially at cryogenic temperatures. Another solution to the problem involves filling the narrowest portion of the gap between the skirt and the dome with a wedge of honeycomb. The outboard surface of the honeycomb is hand trimmed to match the cylindrical face of a skirt tool which is butted up against the honeycomb wedge. This solution may also be undesirable because the presence of the honeycomb may make it difficult to dry-gas purge the joint of moisture prior to filling the tank with a propellant.

Accordingly, there is a need for a tool device and method for fabricating composite structures having joints forming narrow gaps, that reduce the need for hand fitting vacuum bags into the gap and which permit the use of conventional bag materials and sealants.

SUMMARY

The disclosed embodiments provide a method and tool device for constructing joints presenting narrow gaps in composite structures, such as propellant tank comprising a tank dome surrounded by a tank skirt. The device comprises a skirt tool shell attached to a spacer in the form of skirt tool contact blocks that have a preselected thickness. The skirt tool blocks are used to fill a portion the gap in a joint just outboard of the tangent point where the tank skirt meets the tank dome, allowing a vacuum bag to be matched to a wider portion of the skirt-to-dome gap. The areas of a vacuum bag requiring sealing are spaced from the joint area, reducing the possibility of residual sealant material providing an unwanted load path between the dome and the skirt wall. The disclosed device may not leave parasitic tooling material in the joint after curing. Following curing, the tool device can be removed from the joint area, leaving the joint exposed so that it may be purged of moisture.

According to one disclosed embodiment, a tool device is provided for forming a joint between a composite skirt and a composite dome disposed within and joined to the inner surface of the skirt. The tool device comprises a skirt tool shell and a spacer connected with the shell. Composite plies may be laid up on the skirt tool shell in order to form the skirt, and the spacer fills at least a portion of a gap between the dome and the skirt. The skirt comprises a substantially hollow body-of-revolution, and the spacer includes a contoured surface conformally engaging the dome. The spacer may include a plurality of blocks arranged side-by-side around the curvature of the dome. The blocks and the shell are joined together by a circumferentially extending lap joint between the blocks and the shell.

According to another embodiment, a tool is provided for laying up a composite dome. The tool comprises a spacer adjacent a tangent between the skirt and the dome, and a shell connected with the spacer. The spacer and the shell each have a curved outer surface on which composite plies may be laid up to form the skirt. The spacer includes a plurality of blocks, each having a surface conforming to and engaging the dome.

According to a further embodiment, a method is provided of forming a joint between a composite dome and a surrounding composite skirt. The method comprises positioning a layup tool on the dome, including placing a spacer on the dome, and connecting a shell with a spacer. The method further comprises forming the skirt by laying up composite plies over the combination of the spacer and the shell. Connecting the shell with the spacer includes forming a lap joint between the spacer and the shell, and using fasteners to secure the spacer to the shell.

According to still another embodiment, a method is provided of fabricating a composite structure including a composite dome surrounded by a composite skirt. The method comprises laying up the composite dome and placing a tool on the dome for laying up the skirt, including placing a spacer on the dome for filling at least a portion of the gap between the dome layup and a skirt layup. The method further comprises laying up the composite skirt over the tool. The method further comprises vacuum bagging the structure, including fitting a vacuum bag in a portion of the gap adjacent the spacer, and contouring a face of the spacer to substantially match the contour of the dome. The method further comprises contouring a face of the spacer to substantially match the contour of the skirt.

BRIEF DESCRIPTION OF THE ILLUSTRATIONS

DETAILED DESCRIPTION

Figure 1:
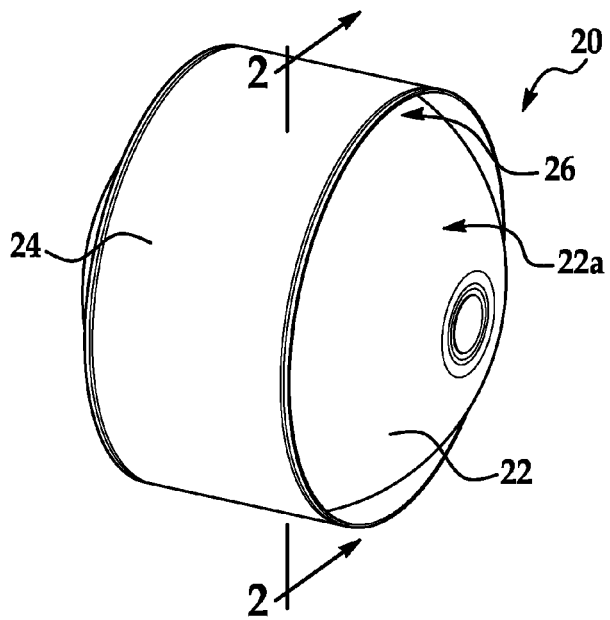
FIG. 1 is an illustration of a perspective view of a tank dome and surrounding tank skirt.
Figure 2:
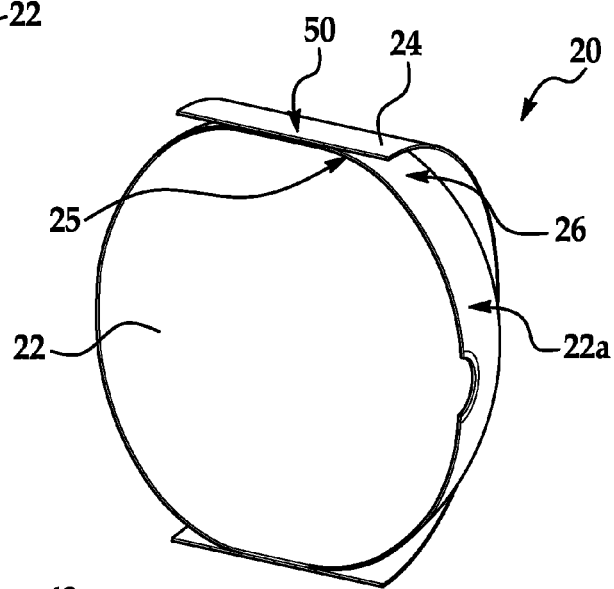
FIG. 2 is an illustration of a sectional view taken along the line 2-2 in FIG. 1.

Referring first to FIGS. 1 and 2, the disclosed embodiments relate to a method and tool device for fabricating a composite structure 20 comprising a composite tank dome 22 surrounded by and secured to a composite tank skirt 24. The tank dome 22 may have any of various shapes suited for the application, and in the illustrated embodiment is generally ellipsoidal in shape. In one application, the tank dome 22 may be charged with a propellant such as rocket fuel for use in aerospace vehicles and the tank skirt 24 adapts the tank dome 22 to be mounted on a structure such as a vehicle (not shown). In the illustrated embodiment, the tank skirt 24 is substantially cylindrical in shape, however other bodies of revolution are possible, for example and without limitation, a cone. Additionally, the term "dome" as used herein is not limited to the shape illustrated in the Figures but rather is intended to include a variety of bodies-of-revolution, including but not limited to those having compound contours.

The tank dome 22 intersects and is connected with the tank skirt 24 at a tangent 50. In other embodiments, the tank skirt 24 may intersect the curved outer surface 22a of the tank dome 22 at locations (not shown) other than at the tangent 50. The curved outer surface 22a of the tank dome 22 converges with the cylindrical tank skirt 24 to form a Y-joint between the tank dome 22 and the tank skirt 24 which includes a skirt-to-dome gap 26. In one embodiment, the tank dome 22 may be pre-cured, and the tank skirt 24 is laid up over the tank dome 22 and bonded to the dome 22 with a suitable adhesive. In other embodiments, the tank dome 22 and tank skirt 24 may be laid up, vacuum bagged and co-cured, as by autoclave processing. The disclosed method embodiments may be used to fabricate either monocoque skirts or skirts of a sandwich-type construction, having a core such as a fluted core.

Figure 3:
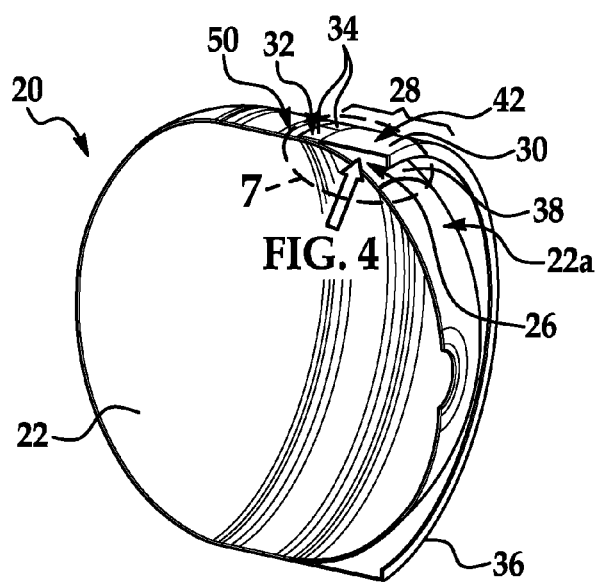
FIG. 3 is an illustration of a cross sectional view of the tank dome having a tool device installed thereon for creating a joint between the dome and skirt shown in FIGS. 1 and 2.

Attention is now directed to FIG. 3 which illustrates a tool device 28 used to form the Y-joint 25 shown in FIG. 2. The tool 28 comprises a generally cylindrical tool spacer 32 fastened to a cylindrical skirt tool shell 30. The spacer 32 is positioned just outboard of a tangent point 50 where the tank skirt 24 (FIG. 2) meets the tank dome 22, and fills a portion of the skirt-to-dome gap 26. The spacer 32 comprises a plurality of skirt tool contact blocks 34 arranged side-by-side around the circumference of the tool 28. The tool device 28 has an outer cylindrical surface 42 extending from the tangent point 50 on the tank dome 22.

The tool shell 30 includes a circumferentially extending flange 36 on one end thereof opposite the spacer 32 which provides a means of gripping the tool device 28 and pulling it away from the cured structure 20. In some embodiments however, IML projections may be present that may preclude withdrawing a single piece tool device 28 from the cured skirt 24. Where such IML projections are present, the skirt tool shell 30 may be made in a takedown configuration to allow its removal from the cured skirt 24. FIG. 3 illustrates a portion of a vacuum bag 38 having been fitted into the gap 26 between the curved surface 22a of the tank dome 22 and the tool device 28. The outer mold line (OML) of the skirt tool shell 30 is dictated by the skirt inner mold line (IML) geometry.

Figure 4:
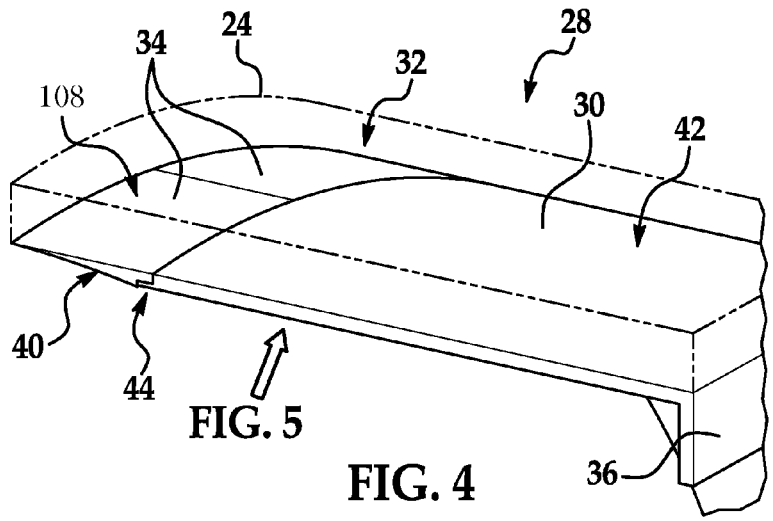
FIG. 4 is an illustration of a perspective view of the outboard side of the tool device, a tank skirt layup being shown in the phantom.
Figure 5:
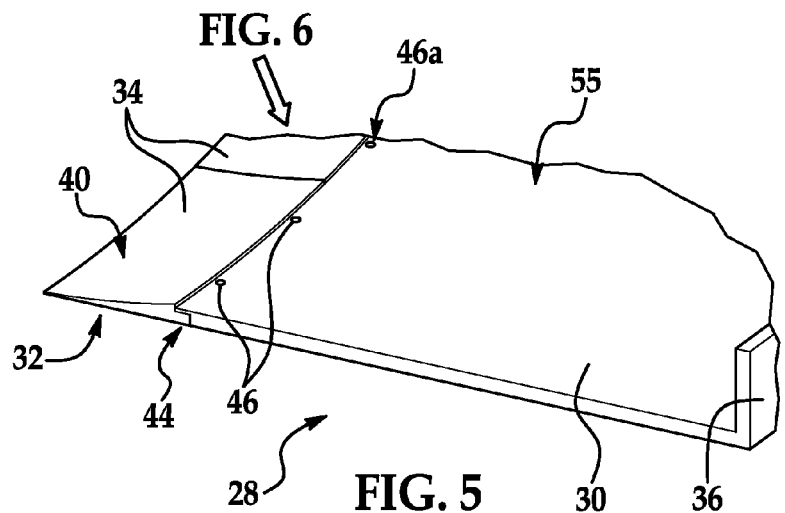
FIG. 5 is an illustration of the inboard side of the tool device shown in FIGS. 3 and 4.
Figure 6:
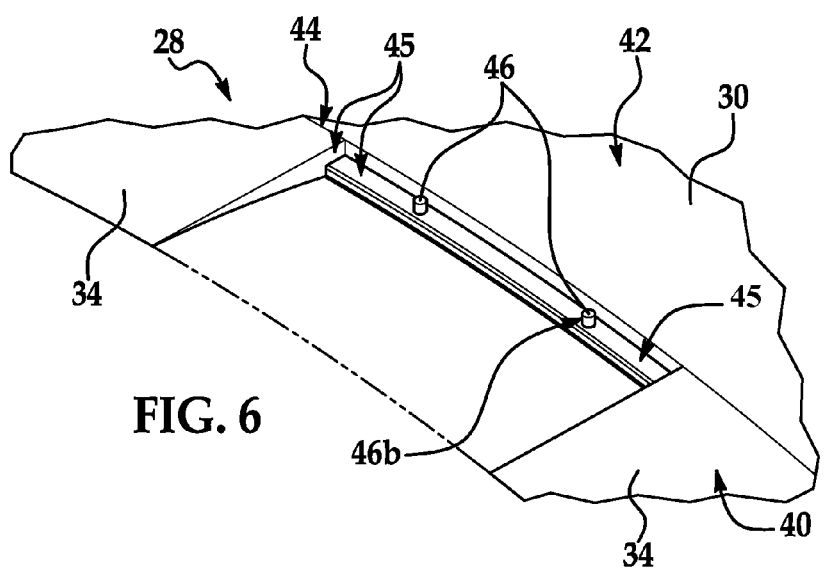
FIG. 6 is an illustration of a perspective view of a portion of the inboard side of the tool device shown in FIGS. 4 and 5, better illustrating a lap joint between the skirt tool contact blocks and the skirt tool shell.

FIGS. 4-6 illustrate additional details of the tool device 28. The tool shell 30 and the tool spacer 32 may be fabricated of any suitable materials, including but limited to metals and composites. The tool shell 30 is preferably made of a material having an in-plane coefficient of thermal expansion (CTE) that is similar to that of the composite material comprising the tank dome 22. Matching of these CTE's may be needed in order to prevent formation of a step between the tank dome 22 and the tool device 28 during curing which may wrinkle the laminate on the tank skirt 24. For example, and without limitation, where the tank dome 22 and tank skirt 24 are fabricated of carbon fiber epoxy, then the tool shell 30 may be made of a composite with a similar CTE. Similarly, the contact blocks 34 may be fabricated of a material that matches the CTE of the material used for the tank dome, both in the in-plane and through the thickness directions. For example, and without limitation, in one application where the tank dome 22 is fabricated of a carbon fiber epoxy, the contact blocks 34 may be fabricated of titanium.

As shown in FIG. 4, each of the contact blocks 32 is substantially wedge shaped in cross section and includes an curved outer surface 108 matching the curvature of the outer surface 42 of the tool shell 30. The number of the contact blocks 32 used may depend on the application and manufacturing convenience. As best seen in FIGS. 5 and 6, the inner surface 40 of each of the contact blocks 34 has a curvature that substantially matches the curved outer surface 22a (FIG. 3) of the dome 22.

The tool shell 30 is fastened to the tool blocks 40 along a lap joint 44. As shown in FIG. 6, the lap joint 44 is formed by overlapping portions 45 of the contact blocks 34 and the shell 30 which are secured together by a plurality of circumferentially spaced fasteners 46. While a lap joint 44 is shown in the illustrated embodiment, other types of joints are possible, for instance and without limitation, scarf or butt joints. The inboard ends 46a (FIG. 5) of the fasteners 46 are substantially flush with the inboard surface 55 of the skirt tool shell 30 so as to not interfere with an overlying vacuum bag (not shown) during curing. The outboard ends 46b (FIG. 6) of the fasteners 46 are blind, i.e., they are recessed beneath the outboard surface 42 of the tool shell. The inboard surface 55 of the tool shell 30 is substantially smooth so that the fitted vacuum bag 38 lie flush against this surface so as not to be subjected to undesired bridging stresses.

Figure 7:
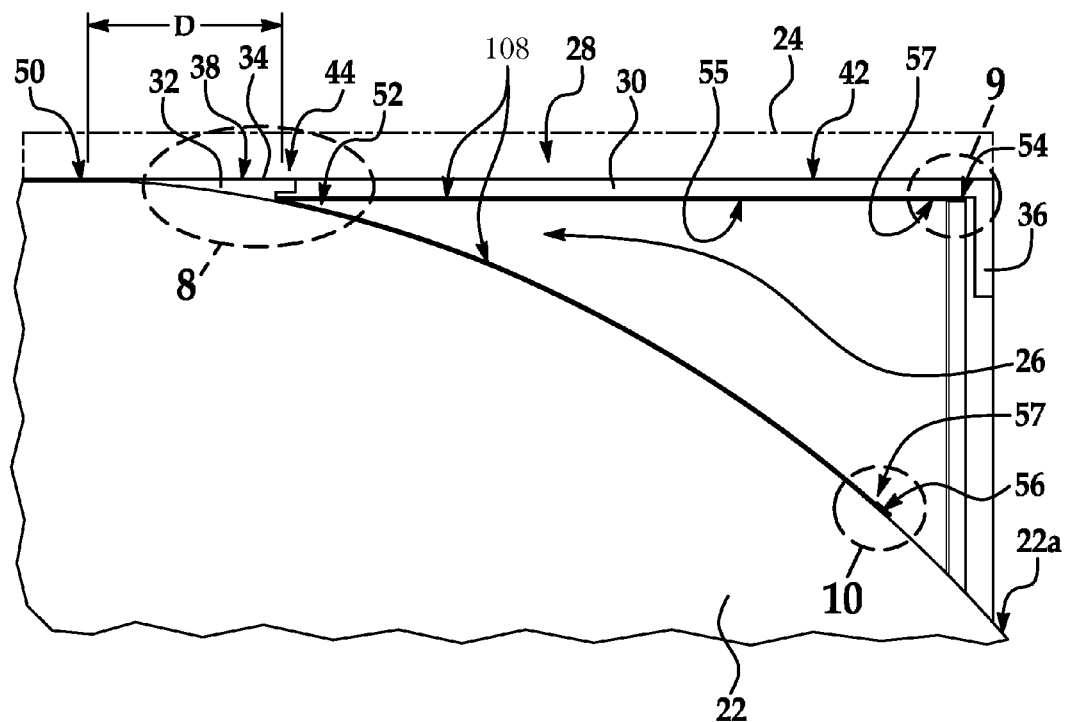
FIG. 7 is an illustration of a sectional view of the area designated as FIG. 7 in FIG. 3, a tank skirt layup being indicated in the phantom.
Figure 8:
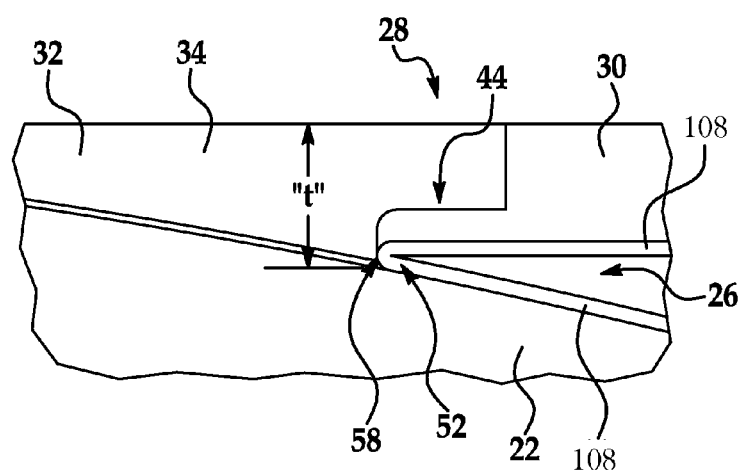
FIG. 8 is an illustration of a sectional view of the area designated as FIG. 8 in FIG. 7.

FIGS. 7-10 illustrate the tool device 28 having been placed on the curved surface 22a of the tank dome 22, wherein the tank skirt layup 24 is indicated in the phantom. As best seen in FIG. 7, the cylindrical surfaces 108, 42 of the tool spacer 32 and tool shell 30 respectively, extend laterally outward from the tangent 50 on the tank dome 22. The spacer 32 fills the narrowest portion of the skirt-to-dome gap 52 and allows the overlying skirt layup 24 to be supported through the tank dome 22 by the tank shell tool 30 during curing. The plies (not shown) of the skirt layup 24 are wrapped around the tool device 28 and cover the dome 22 at the tangent 50.

The tool blocks 34 conformally engage the curved surface 22a of the dome 22 and space the gap 52 between the skirt layup 24 and the curved surface 22a a distance "D" from the tangent 50 on the dome 22. The distance "D" is determined in part by the preselected thickness "t" (FIG. 8) of the tool blocks 34. The vacuum bag 38 has a fold formed there at 58 to allow the bag 38 to be fitted into the gap 52, and extends outwardly from the fold 58, covering a portion of the curved surface 22a and inboard surface 55 of the tool shell 30. The bag 38 is sealed to the tool shell 30 and to the dome 22 by seals 54, 56 at locations that are relatively distant from the dome-to-skirt gap 52, and thus are reasonably accessible. The material selected for the bag 38 should be strong enough and/or thick enough to avoid failure due to bridging in any areas where complete bag support may not be provided. One material suitable for use as the bag 38 is silicone rubber. The bag 38 may also be preformed, for example, from gore segments that are heat fused into a shaped assembly, typically by working the fused segments over a formed tool (not shown).

Figure 11:
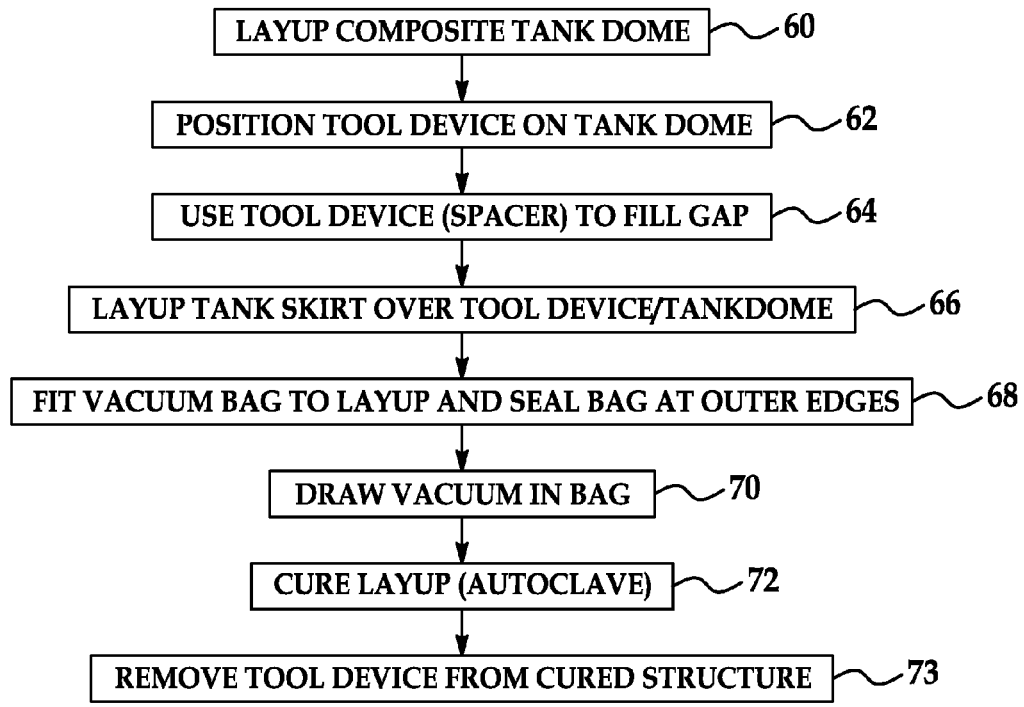
FIG. 11 is an illustration of a flow diagram of a method of fabricating the composite structure shown in FIGS. 1 and 2.

Attention is now directed to FIG. 11 which illustrates the overall steps of a method of fabricating the composite structure 20 shown in FIG. 1. Beginning at step 60, the composite tank dome 22 is laid up on a suitable tool (not shown) following which, at 62, the tool device 28 is placed on the tank dome 22 in the position illustrated in FIG. 7.

Figure 9:
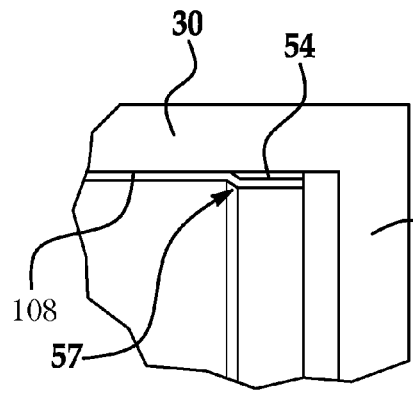
FIG. 9 is a sectional view of the area designated as FIG. 9 in FIG. 7.
Figure 10:
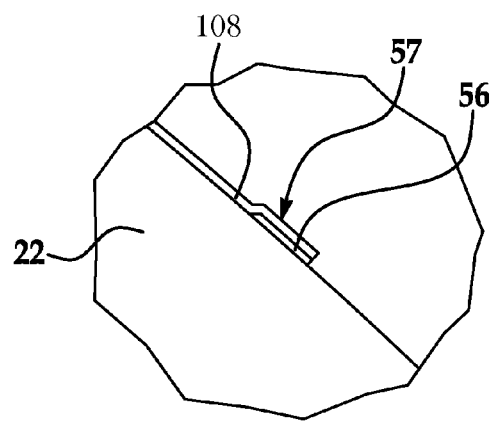
FIG. 10 is an illustration of the area designated as FIG. 10 in FIG. 7.

With the tool 28 having been positioned at step 62, the spacer 32 and more particularly the contact tool blocks 34, fills the dome-to-skirt gap, shown at 64. At step 66, the tank skirt 24 is laid up over the tank dome 22 and the tool device 28. With the tank skirt 24 laid up, then, at step 68, a fold 58 (FIG. 8) is formed in a vacuum bag 38 and the bag 38 is fitted into the gap 52. The outer edges 57 of the bag 38 are sealed, as shown in FIGS. 7, 9 and 10, to the tank dome 22 and the tank shell 30 using a suitable sealant form seals 56, 56 (FIGS. 9 and 10). Next, at 70, the vacuum is drawn in the bag 38 and the entire layup assembly may be placed in an autoclave (not shown) for curing at 72. Following curing, the tool device 28 is removed from the cured structure 20 at step 73.

Figure 12:
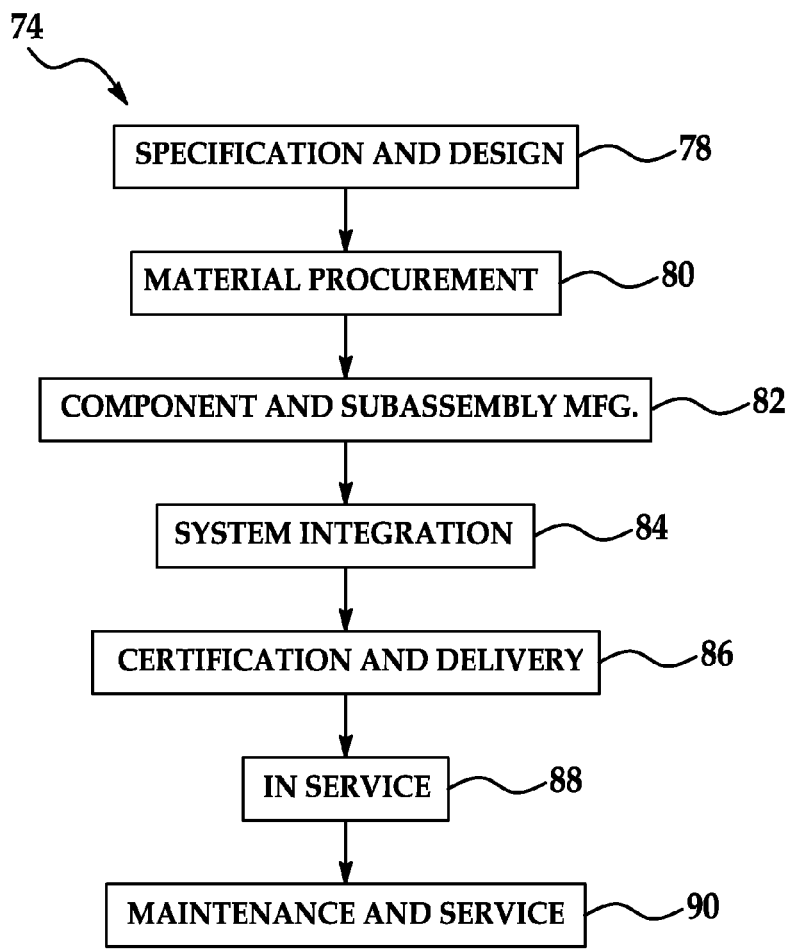
FIG. 12 is a flow diagram of aerospace vehicle production and service methodology.
Figure 13:
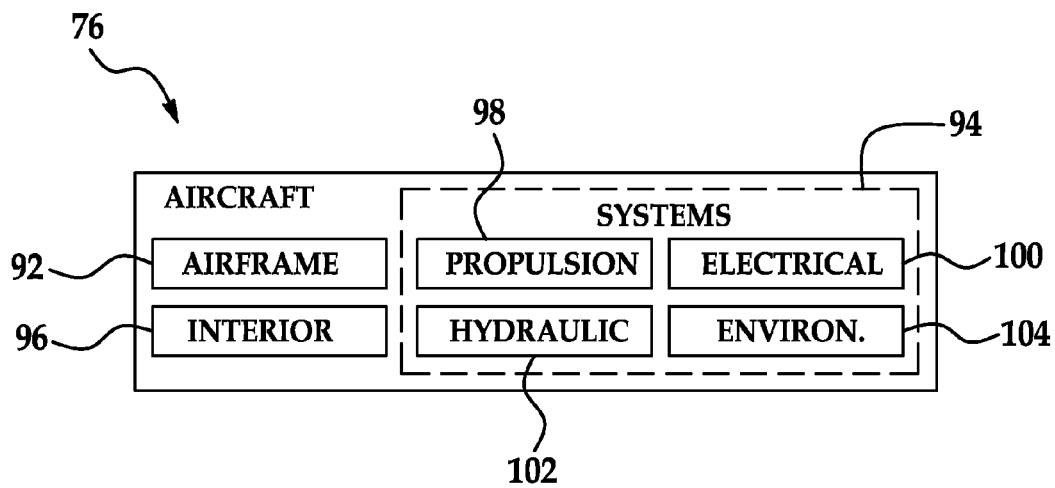
FIG. 13 is a block diagram of an aerospace vehicle.

Referring next to FIGS. 12 and 13, embodiments of the disclosure may be used in the context of an aerospace manufacturing and service method 74 as shown in FIG. 12 and an aerospace vehicle 76 as shown in FIG. 13. During pre-production, exemplary method 74 may include specification and design 78 of the aerospace vehicle 76 and material procurement 80. During production, component and subassembly manufacturing 82 and system integration 84 of the aerospace vehicle 76 takes place. During step 82, the disclosed method and apparatus may be employed to fabricate composite parts such as fuselage sections which are then assembled at step 84. Thereafter, the aerospace vehicle 76 may go through certification and delivery 86 in order to be placed in service 88. While in service by a customer, the aerospace vehicle 76 may be scheduled for routine maintenance and service 90 (which may also include modification, reconfiguration, refurbishment, and so on).

Each of the processes of method 74 may be performed or carried out by a system integrator, a third party, and/or an operator (e.g., a customer). For the purposes of this description, a system integrator may include without limitation any number of aerospace vehicle manufacturers and major-system subcontractors; a third party may include without limitation any number of vendors, subcontractors, and suppliers; and an operator may be an airline, leasing company, military entity, service organization, and so on.

As shown in FIG. 13, the aerospace vehicle 76 produced by exemplary method 74 may include an airframe 92 with a plurality of systems 94 and an interior 96. Examples of high-level systems 94 include one or more of a propulsion system 98, an electrical system 100, a hydraulic system 102, and an environmental system 104. Any number of other systems may be included. The disclosed method and apparatus may be employed to fabricate parts of the airframe 92, or propellant tanks forming part of the propulsion system 98. Although an aerospace example is shown, the principles of the invention may be applied to other industries, such as the automotive industry.

The tool device embodied herein may be employed during any one or more of the stages of the production and service method 74. For example, components or subassemblies corresponding to production process 138 may be fabricated or manufactured in a manner similar to components or subassemblies produced while the aerospace vehicle 76 is in service. Also, one or more apparatus embodiments may be utilized during the production stages 82 and 84, for example, by substantially expediting assembly of or reducing the cost of an aerospace vehicle 76. Similarly, one or more apparatus embodiments may be utilized while the aerospace vehicle is in service, for example and without limitation, to maintenance and service 90.

Although the embodiments of this disclosure have been described with respect to certain exemplary embodiments, it is to be understood that the specific embodiments are for purposes of illustration and not limitation, as other variations will occur to those of skill in the art.

What is claimed:

1. A tool device for forming a joint between a composite skirt and a composite dome disposed within and joined to an inner surface of the composite skirt, comprising:
    a skirt tool shell configured to receive composite plies laid up to form the skirt, the shell including a circumferentially extending flange on an end thereof, the flange configured to receive a force that pulls the tool away from the skirt after the skirt has been cured, the skirt intersecting a surface of the dome; and
    a spacer comprising a plurality of tool blocks arranged side-by-side around a curvature of the dome, the skirt tool connected to the spacer at a joint, an inboard surface of the skirt tool shell and spacer being substantially smooth and contoured to match a curvature of the dome, an outer surface of the spacer substantially matching an inner mold line of the skirt, the spacer configured to space a vacuum bag away from a point of tangency between the skirt and the dome.

2. The apparatus of claim 1, wherein the tool blocks and the shell are joined together by a circumferentially extending lap joint between the tool blocks and the shell.

3. The apparatus of claim 2, further comprising:
    fasteners joining each of the tool blocks with the shell.

4. The apparatus of claim 1, wherein:
    the skirt intersects the surface of the dome at a tangent on the dome,
    the skirt is a substantially hollow body-of-revolution, and
    the spacer includes a contoured surface conformally engaging the dome.

5. The apparatus of claim 4, wherein:
    the skirt tool shell is joined to each of the blocks by a lap joint,
    each of the tool blocks is generally wedge-shaped in cross section, and
    each of the tool blocks includes an outer mold line forming the inner mold line of the skirt.

6. A tool for laying up a curved composite skirt over a composite dome, comprising:
    a spacer comprising a plurality of blocks each having a surface conforming to and engaging the dome, and contoured to match a curvature of the dome, an outer surface of the spacer substantially matching an inner mold line of the skirt, the spacer configured to space a vacuum bag away from a point of tangency between the skirt and the dome; and
    a shell connected with the spacer, the shell configured to receive complete plies laid up to form the skirt, a joint connecting the spacer with the shell, the joint selected from the group consisting of lap joints, butt joints, and scarf joints, an inboard surface of the skirt tool shell and spacer being substantially smooth, the shell including a circumferentially extending flange on an end thereof, the flange configured to receive a force that pulls the tool away from the skirt after the skirt has been cured.

7. The tool of claim 6 wherein the spacer and the shell each having a curved outer surface on which composite plies may be laid up to form the skirt.

8. The tool of claim 6 further comprising:
a lap joint connecting the spacer with the shell and a plurality of fasteners flush with an inboard surface of the spacer and the shell.

9. The tool of claim 6 wherein:
the shell is a substantially hollow cylinder,
the spacer is connected to the shell and includes a cylindrical outer surface having a diameter substantially equal to the outer diameter of the shell.

10. A tool for laying up a combination composite domed composite propellant tank and surrounding outer skirt, comprising:
a cylindrical spacer for spacing a vacuum bag away from a point of tangency between the skirt and the tank, the spacer having an inner surface contoured to match the curvature of the domed tank and an outer surface matching the inner mold line of the skirt, the spacer including a plurality of blocks circumferentially arranged side-by-side; and
a generally hollow cylindrical tool shell on which plies may be laid up to form the skirt, the shell including a circumferentially extending flange on one end thereof on which a force may be applied for pulling the tool away from the skirt after the skirt has been cured;
a circumferentially extending lap joint between the spacer and the shell; and
fasteners passing through the lap joint for attaching the spacer to the shell.

11. A method of forming composite skirt for a dome, comprising:
positioning a layup tool on the dome, including placing a spacer on the dome;
connecting a shell with the spacer at a joint;
laying up the composite skirt over the layup tool;
curing the skirt; and
removing the shell and the spacer from the cured skirt.

12. The method of claim 11, wherein connecting the shell with the spacer includes:
forming a lap joint between the spacer and the shell, and using fasteners to secure the spacer to the shell.

13. The method of claim, 11, further comprising:
forming the skirt by laying up composite plies over the combination of the spacer and the shell.

14. A method of fabricating a composite structure including a composite dome surrounded by a composite skirt, comprising:
laying up the composite dome;
placing a tool on the dome for laying up the skirt, including placing a spacer on the dome for filling at least a portion of a gap between the dome layup and a skirt layup;
laying up the composite skirt over the tool;
curing the skirt; and
removing the spacer from the cured skirt.

15. The method of claim 14, further comprising:
connecting a tool shell on an end of the spacer.

16. The method of claim 14, further comprising:
vacuum bagging the structure, including fitting a vacuum bag in a portion of the gap adjacent the spacer.

17. The method of claim 14, further comprising:
contouring a face of the spacer to substantially match the contour of the dome.

18. The method of claim 14, further comprising:
contouring a face of the spacer to substantially match the inner mold line of the skirt.

19. A method of fabricating a domed cryogenic propellant tank held in an outer skirt, comprising:
laying up composite plies to form the dome;
forming a spacer having a wedge shaped cross section and comprising a plurality of tool blocks arranged side-by-side around a curvature of the dome, including forming an outer mold line (OML) surface and forming an inner surface matching the contour of the dome, the spacer configured to space a vacuum bag away from a point of tangency between the skirt and the dome;
mounting a shell on the end of the spacer, including aligning an OML surface of the shell with the outer tool surface of the spacer, the shell connected to the spacer at a joint, an inboard surface of the shell and spacer being substantially smooth, the shell configured to receive composite plies laid up to form the skirt, the shell including a circumferentially extending flange on an end thereof, the flange configured to receive a force that pulls the tool away from the skirt after the skirt has been cured, the skirt intersecting a surface of the dome;
positioning the shell and the spacer on the dome layup;
forming a composite skirt layup by laying up plies of composite material on the shell and the spacer;
fitting a vacuum bag into a gap between the shell and the spacer, the vacuum bag contacting a portion of the inboard surface of the shell and spacer; and
drawing a vacuum in the vacuum bag.

\* \* \* \* \*